United States Patent
Swaroop et al.

(10) Patent No.: US 11,912,561 B2
(45) Date of Patent: Feb. 27, 2024

(54) PREVENTIVE MAINTENANCE OF FUEL DISPENSERS THROUGH INVENTORY RECONCILIATION AND IDENTIFICATION OF METER DRIFT

(71) Applicant: Wayne Fueling Systems LLC, Austin, TX (US)

(72) Inventors: Prem Swaroop, Arlington, MA (US); Atish Kamble, Arlington, MA (US); Bodhayan Dev, Marlborough, MA (US)

(73) Assignee: Wayne Fueling Systems LLC, Austin, TX (US)

( * ) Notice: Subject to any disclaimer, the term of this patent is extended or adjusted under 35 U.S.C. 154(b) by 564 days.

(21) Appl. No.: 17/133,020

(22) Filed: Dec. 23, 2020

(65) Prior Publication Data
US 2022/0194776 A1   Jun. 23, 2022

(51) Int. Cl.
*B67D 7/08* (2010.01)
*G01F 25/17* (2022.01)
(Continued)

(52) U.S. Cl.
CPC ............. *B67D 7/085* (2013.01); *B67D 7/302* (2013.01); *G01F 1/007* (2013.01); *G01F 25/17* (2022.01)

(58) Field of Classification Search
CPC ......... B67D 7/085; B67D 7/302; G01F 1/007; G01F 25/17
See application file for complete search history.

(56) References Cited

U.S. PATENT DOCUMENTS

| 5,400,253 A | 3/1995 | Oconnor |
| 6,092,410 A | 7/2000 | Kaehler et al. |

(Continued)

FOREIGN PATENT DOCUMENTS

| AU | 2012244083 A1 | 11/2012 |
| CN | 108108832 B | 10/2018 |

(Continued)

OTHER PUBLICATIONS

International Search Report and Written Opinion for International Patent Application No. PCT/US21/73085, dated Apr. 7, 2022, 12 pages.

(Continued)

*Primary Examiner* — Eric S. McCall
*Assistant Examiner* — Timothy P Graves
(74) *Attorney, Agent, or Firm* — Mintz Levin Cohn Ferris Glovsky and Popeo, P.C.

(57) ABSTRACT

In one aspect, fuel inventory data characterizing a level of fuel stored at a fuel storage facility can be received from a sensor in operable communication with the fuel storage facility. Flow meter data characterizing an amount of fuel dispensed from the fuel storage facility by a fuel dispenser nozzle can be received from a flow meter in fluid communication with the fuel dispenser nozzle and the fuel storage facility. Fuel transaction data characterizing the dispensing of fuel by the fuel dispenser nozzle and the dispensing of the fuel by one or more additional fuel dispenser nozzles in fluid communication with the fuel storage facility can be received. An estimate of meter drift characterizing a change in calibration of the flow meter can be determined based on the fuel inventory data, the flow meter data, and the fuel transaction data. The estimate of meter drift can be provided.

19 Claims, 8 Drawing Sheets

(51) Int. Cl.
*B67D 7/30* (2010.01)
*G01F 1/00* (2022.01)

(56) References Cited

U.S. PATENT DOCUMENTS

| | | |
|---|---|---|
| 6,996,485 B2 | 2/2006 | Payne |
| 9,354,091 B2 | 5/2016 | Vaissiere |
| 9,558,453 B1 | 1/2017 | Chaudhary et al. |
| 10,606,285 B2 | 3/2020 | Ding |
| 11,518,671 B2 | 12/2022 | Swaroop et al. |
| 2002/0049549 A1 | 4/2002 | Rogers et al. |
| 2008/0125930 A1 | 5/2008 | Johnson |
| 2008/0295568 A1 | 12/2008 | Nanaji et al. |
| 2009/0248325 A1 | 10/2009 | Humphrey |
| 2013/0199262 A1 | 8/2013 | Nielson et al. |
| 2017/0074706 A1 | 3/2017 | Heide et al. |
| 2018/0031399 A1 | 2/2018 | Heide et al. |
| 2018/0037451 A1* | 2/2018 | Johnson .................. G01F 22/00 |
| 2018/0044159 A1 | 2/2018 | Crouse et al. |
| 2018/0300639 A1 | 10/2018 | Abbas |
| 2021/0403312 A1 | 12/2021 | Swaroop et al. |
| 2021/0404904 A1 | 12/2021 | Swaroop et al. |
| 2023/0139144 A1 | 5/2023 | Swaroop et al. |

FOREIGN PATENT DOCUMENTS

| | | |
|---|---|---|
| WO | 2006032873 A1 | 3/2006 |
| WO | 2022006090 A1 | 1/2022 |
| WO | 2022006110 A1 | 1/2022 |
| WO | 2022140789 A1 | 6/2022 |

OTHER PUBLICATIONS

International Search Report and Written Opinion received for International Application No. PCT/US21/39592 dated Oct. 21, 2021, 13 pages.

International Search Report and Written Opinion received for International Application No. PCT/US21/39618, dated Oct. 22, 2021, 14 Pages.

* cited by examiner

PREVENTIVE MAINTENANCE OF FUEL DISPENSERS THROUGH INVENTORY RECONCILIATION AND IDENTIFICATION OF METER DRIFT

FIELD

Systems and methods are provided for the preventive maintenance of fuel dispensers through inventory reconciliation and identification of meter drift. Related apparatus, techniques, and articles are also described.

BACKGROUND

An aspect of fuel dispenser operation during a fueling transaction is that the fuel dispenser can accurately provide a desired amount of fuel to a fueling station customer. The fuel dispenser may typically include a flow meter that is responsible for measuring the amount of fuel provided to the fueling station customer during the fueling transaction. The flow meter is accurately calibrated, usually on an annual basis, and certified as such by applicable regulatory agencies to ensure that the fuel dispenser accurately provides the desired amount of fuel to the fueling station customer.

At present, fueling stations rely on annual or periodic calibration of a fuel dispenser flow meter to ensure that the accuracy of fuel dispensing is maintained, and assume that the calibration of a fuel dispenser flow meter is relatively stable between calibrations. However, it is known that occasionally the calibration of the flow meter responsible for ensuring the accurate dispensing of fuel may drift from its proper parameter (which is referred to as "meter drift") in between calibration. When this occurs, the fuel dispenser does not accurately dispense the desired amount of fuel, which can cause a loss either to the fueling station customer or to the fueling station depending on the direction of calibration drift from the proper calibration parameter. Additionally, this may also impact fueling station inventory reconciliation, which may result in inaccurate estimates of leaks from one or more fueling tanks located at a fueling station, environmental contamination, damaged reputation, and public health risks. In addition, this may result in a lack of compliance with applicable environmental protection laws, which could result in heavy penalties issued to the fueling station owner from applicable regulatory agencies. Although these losses may be small, the magnitude of these impacts increases as the time between the onset of the meter drift and the detection of the meter drift increases. And, at present, some conventional systems for the monitoring of wetstock (e.g., fuel inventory) at fueling stations do not provide the ability to readily detect losses associated with meter drift on a real-time basis.

SUMMARY

Systems and methods are provided for the preventive maintenance of fuel dispensers through inventory reconciliation and identification of meter drift. Related apparatus, techniques, and articles are also described.

In one aspect, fuel inventory data characterizing a level of fuel stored at a fuel storage facility can be received from a sensor in operable communication with the fuel storage facility. Flow meter data characterizing an amount of fuel dispensed from the fuel storage facility by a fuel dispenser nozzle and measured by the flow meter can be received from a flow meter in fluid communication with the fuel dispenser nozzle and the fuel storage facility. Fuel transaction data characterizing the dispensing of fuel by the fuel dispenser nozzle and the dispensing of the fuel by one or more additional fuel dispenser nozzles in fluid communication with the fuel storage facility can be received. An estimate of meter drift characterizing a change in calibration of the flow meter can be determined based on the received fuel inventory data, the received flow meter data, and the received fuel transaction data. The estimate of meter drift can be provided.

One or more of the following features can be included in any feasible combination. For example, the determination of the estimate of meter drift can include determining a meter ratio corresponding to the flow meter, the meter ratio characterizing a ratio of a determined volume of fuel dispensed by the fuel dispenser nozzle over a period of time to a determined change in the level of fuel stored at the fuel storage facility over the period of time, and determining an amount of deviation of the determined meter ratio from previously-determined meter ratios corresponding to the flow meter, wherein the determined amount of deviation characterizes the estimate of meter drift. For example, the period of time can be defined by a dispensing event in which fuel is dispensed only by the fuel dispenser nozzle, and the dispensing event can be determined based on the received fuel inventory data, the received flow meter data, and the received fuel transaction data. For example, the volume of fuel dispensed by the fuel dispenser nozzle over the period of time can be determined based on the flow meter data and the determined dispensing event. For example, the change of the level of fuel stored at the fuel storage facility can be determined based on the received fuel inventory data and the determined dispensing event. For example, the determined meter ratio can be compared to one or more additional meter ratios, the one or more meter ratios each corresponding to one or more additional flow meters, each of the one or more additional flow meters in fluid communication with one of the one or more additional fuel dispenser nozzles and the fuel storage facility, and a discrepancy factor for the flow meter characterizing a discrepancy of the determined meter ratio from the one or more additional meter ratios can be determined based on the comparison. For example, second flow meter data, characterizing an amount of fuel dispensed from the fuel storage facility by a second fuel dispenser nozzle and measured by the second flow meter, can be received from a second flow meter in fluid communication with the second fuel dispenser nozzle and the fuel storage facility. For example, an overlapping dispensing event, characterizing a first period of time in which fuel is dispensed by the fuel dispenser nozzle and a second period of time in which fuel is dispensed by the second fuel dispenser nozzle, such that at least a portion of the first and second periods of time overlap during a period of overlap, and that fuel is only dispensed from the fuel dispenser nozzle and the second fuel dispenser nozzle during the period of overlap, can be determined based on the received fuel inventory data, the flow meter data, the second flow meter data, and the fuel transaction data. For example, a change of the level of fuel stored at the fuel storage facility during a window of time which begins with the earlier of the start of the first period of time and the second period of time and ends with the later of the end of the first period of time and the second period of time can be determined. For example, a first meter ratio corresponding to the flow meter can be determined based on the determined change of the level of fuel, the flow meter data, the fuel transaction data, and the second flow meter data. For example, a second meter ratio corresponding to the second flow meter can be determined based on the determined change of the level of fuel, the flow meter data, the fuel transaction data, and the second flow meter data. For example, an amount of deviation of the determined first meter ratio from previously-determined meter ratios corresponding to the flow meter, wherein the determined amount of deviation characterizes the meter drift estimate corresponding to the flow meter, can be determined. For example, the providing of the estimate of meter drift can include determining a graphical depiction characterizing the estimate of meter drift, and providing the graphical depiction to a graphical user interface for depiction on a display. For example, the graphical user interface can be configured to indicate that the estimate of meter drift exceeds a predetermined meter drift threshold.

In another aspect, a system is provided and can include at least one data processor and memory storing instructions configured to cause the at least one data processor to perform operations described herein. The operations can include receiving, from a sensor in operable communication with a fuel storage facility, fuel inventory data characterizing a level of fuel stored at the fuel storage facility; receiving, from a flow meter in fluid communication with a fuel dispenser nozzle and the fuel storage facility, flow meter data characterizing an amount of fuel dispensed from the fuel storage facility by the fuel dispenser nozzle and measured by the flow meter; receiving fuel transaction data characterizing the dispensing of fuel by the fuel dispenser nozzle and the dispensing of the fuel by one or more additional fuel dispenser nozzles, the one or more additional fuel dispenser nozzles in fluid communication with the fuel storage facility; determining an estimate of meter drift characterizing a change in calibration of the flow meter based on the received fuel inventory data, the received flow meter data, and the received fuel transaction data; and providing the estimate of meter drift.

One or more of the following features can be included in any feasible combination. For example, the determining of the estimate of meter drift can include determining a meter ratio corresponding to the flow meter, the meter ratio characterizing a ratio between a determined volume of fuel dispensed by the fuel dispenser nozzle over a period of time and a determined change in the level of fuel stored at the fuel storage facility over the period of time, and determining an amount of deviation of the determined meter ratio from previously-determined meter ratios corresponding to the flow meter, wherein the determined amount of deviation characterizes the estimate of meter drift. For example, the period of time can be defined by a dispensing event in which fuel is dispensed only by the fuel dispenser nozzle, and wherein the dispensing event is determined based on the received fuel inventory data, the received flow meter data, and the received fuel transaction data. For example, the volume of fuel dispensed by the fuel dispenser nozzle over the period of time can be determined based on the flow meter data and the determined dispensing event. For example, the change of the level of fuel stored at the fuel storage facility can be determined based on the received fuel inventory data and the determined dispensing event. For example, the operations can further comprise comparing the determined meter ratio to one or more additional meter ratios, the one or more meter ratios each corresponding to one or more additional flow meters, each of the one or more additional flow meters in fluid communication with one of the one or more additional fuel dispenser nozzles and the fuel storage facility, and determining a discrepancy factor for the flow meter based on the comparison, the discrepancy factor characterizing a deviation of the determined meter ratio from the one or more additional meter ratios. For example, the operations can further comprise receiving second flow meter data from a second flow meter in fluid communication with a second fuel dispenser nozzle and the fuel storage facility, the second flow meter data characterizing an amount of fuel dispensed from the fuel storage facility by the second fuel dispenser nozzle and measured by the flow meter, and determining, based on the received fuel inventory data, the flow meter data, the second flow meter data, and the fuel transaction data, an overlapping dispensing event, the overlapping dispensing event characterizing a first period of time in which fuel is dispensed by the fuel dispenser nozzle and a second period of time in which fuel is dispensed by the second fuel dispenser nozzle, such that at least a portion of the first and second periods of time overlap during a period of overlap, and that fuel is only dispensed from the fuel dispenser nozzle and the second fuel dispenser nozzle during the period of overlap. For example, the operations can further comprise determining a change of the level of fuel stored at the fuel storage facility during a window of time which begins with the earlier of the start of the first period of time and the second period of time and ends with the later of the end of the first period of time and the second period of time; determining a first meter ratio corresponding to the flow meter and based on the determined change of the level of fuel, the fuel transaction data, the flow meter data, and the second flow meter data; and determining a second meter ratio corresponding to the second flow meter and based on the determined change of the level of fuel, the fuel transaction data, the flow meter data, and the second flow meter data. For example, the operations can further comprise determining an amount of deviation of the determined first meter ratio from previously-determined meter ratios corresponding to the flow meter, wherein the determined amount of deviation characterizes the estimate of meter drift corresponding to the flow meter.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The embodiments herein may be better understood by referring to the following description in conjunction with the accompanying drawings in which like reference numerals indicate identically or functionally similar elements, of which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

At present, fueling stations rely on annual or periodic calibration of a fuel dispenser flow meter to ensure that the accuracy of fuel dispensing is maintained, and assume that the calibration of a fuel dispenser flow meter is relatively stable between calibrations. However, it is known that occasionally the calibration of the flow meter responsible for ensuring the accurate dispensing of fuel may drift from its proper parameter (which is referred to as "meter drift") in between calibration. When this occurs, the fuel dispenser does not accurately dispense the desired amount of fuel, which can cause a loss either to the fueling station customer or to the fueling station depending on the direction of calibration drift from the proper calibration parameter. And, at present, some conventional systems for the monitoring of wetstock (e.g., fuel inventory) at fueling stations do not provide the ability to readily detect losses associated with meter drift on a real-time basis.

The current subject matter includes a methodology that, in some implementations, can detect a drift in the calibration of a flow meter of a fuel dispenser (known as "meter drift") based on the analysis of fuel inventory data that is continuously collected from fuel storage facilities (e.g., in-ground fuel tanks) and fuel dispensing transaction data continuously collected from fuel dispensers at a fueling station. The methodology can analyze the fuel inventory data and the fuel dispensing transaction data to isolate changes in fuel inventory in the fuel storage facility over a period of time that are attributable to fuel dispensed from a specific nozzle of a fuel dispenser at the fueling station. The methodology can then compare the isolated volumetric change in fuel inventory to the volume of fuel dispensed from the nozzle of the fuel dispenser during the same period of time, as measured by the flow meter of the fuel dispenser, to determine whether there are any discrepancies in the measured volumes, and to determine the existence of meter drift in the flow meter if a discrepancy in the measured volumes is determined.

Figure 1:
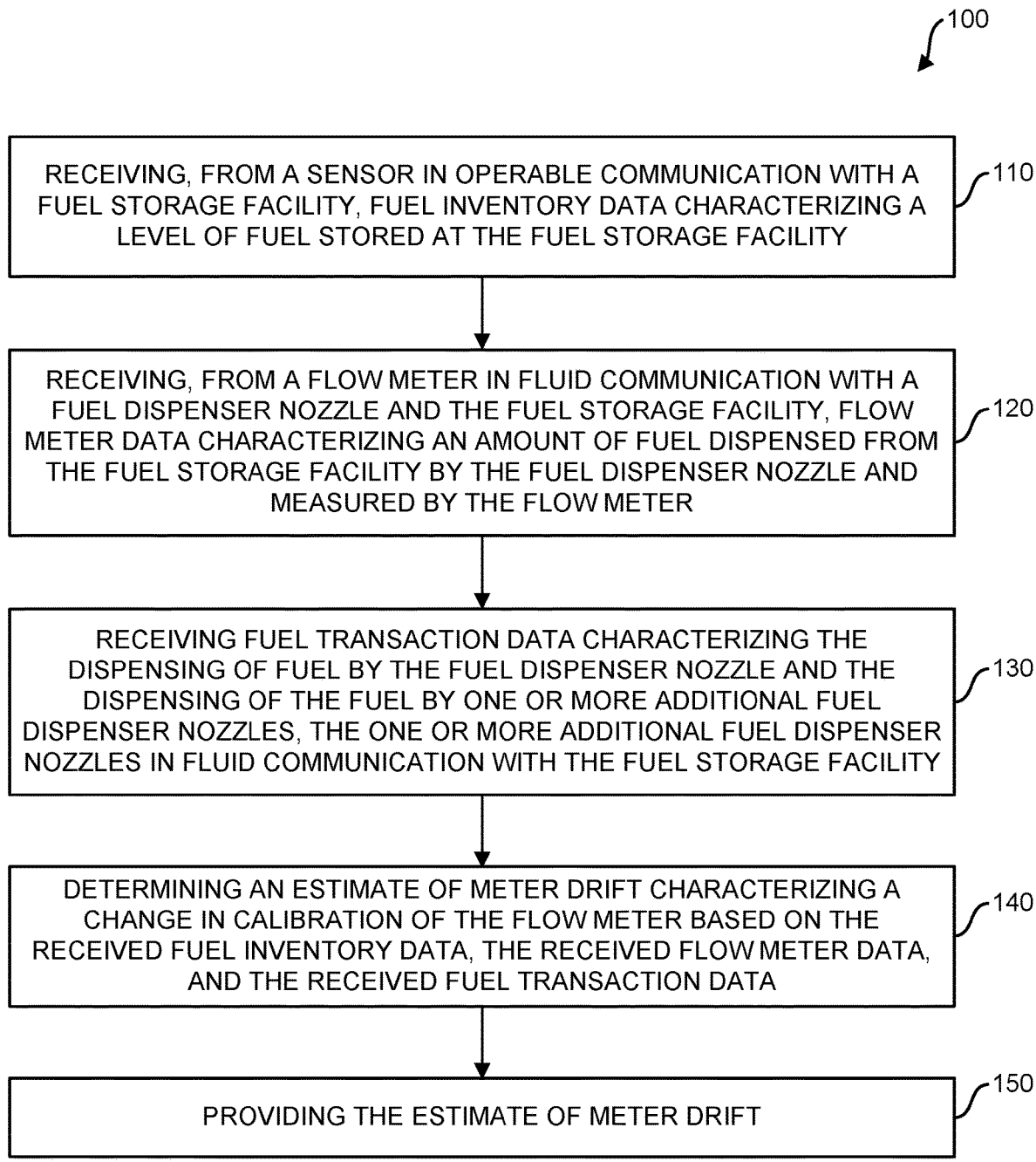
FIG. 1 is a process flow diagram illustrating an example process of some implementations of the current subject matter that can provide for the preventive maintenance of fuel dispensers through inventory reconciliation and identification of meter drift.

FIG. 1 is a process flow diagram illustrating an example process 100 of determining an estimate of meter drift. At 110, data characterizing a level of fuel stored at a fuel storage facility can be received from a sensor that is in operable communication with the fuel storage facility. The sensor can, in some implementations, be configured to determine a level of fuel stored in the fuel storage facility, and the data characterizing the storage facility can include the level of fuel stored in the fuel storage facility. In some implementations, the sensor can include a dipstick, magnetostrictive probe, and/or an automated tank gauge configured to measure the level of fuel stored in the fuel storage facility. In some implementations, the sensor can be configured to determine an amount of fuel added to the fuel storage facility as a result of a delivery of fuel from a fuel supplier to the fuel storage facility, and the data characterizing the fuel storage facility can include amount of fuel added to the fuel storage facility as a result of a delivery of fuel from a fuel supplier to the fuel storage facility. In some implementations, the sensor can be configured to determine an amount of fuel removed from the fuel storage facility as a result of a sale of fuel to a customer, and the data characterizing the fuel storage facility can include the amount of fuel removed from the fuel storage facility as a result of a sale of fuel to the customer. In some implementations, the sensor can comprise a plurality of sensors that incorporate one or more aspects of the functionality described above.

In some implementations, the fuel storage facility can be an underground fuel storage tank at a fueling station that is configured to supply fuel dispensers at the fueling station with fuel. In some implementations, the fuel storage facility can comprise a plurality of underground fuel storage tanks, each located at the fueling station, having one or more of the aforementioned sensors in operable communication therewith, and configured to supply fuel dispensers at the fueling station with fuel. In some implementations, the fuel storage facility can be located at a separate location from the fueling station.

At 120, flow meter data can be received from a flow meter in fluid communication with a fuel dispenser nozzle and the fuel storage facility. The flow meter data can characterize an amount of fuel dispensed from the fuel storage facility by the fuel dispenser and measured by the flow meter. As such, the flow meter can be configured to measure a flow rate of fuel moving through a fuel supply line that delivers fuel from the fuel storage facility to the fuel dispenser nozzle. In some implementations, the flow meter can be disposed in a fuel dispenser to which the fuel dispenser nozzle is coupled. In some implementations, the flow meter can be external to the fuel dispenser. In some implementations, the flow meter can be in operable communication with the fuel dispenser to which the fuel dispenser nozzle is coupled. In some implementations, the flow meter can be coupled to, integrated into, or otherwise integrally formed with the fuel dispenser nozzle such that the flow meter and the fuel dispenser nozzle are the same component or constitute an assembly. In some implementations, the fuel dispenser nozzle can perform all of the functionality of the flow meter described herein, thereby obviating the need for a separate flow meter component.

At 130, fuel transaction data characterizing the dispensing of fuel by the fuel dispenser nozzle and the dispensing of the fuel by one or more additional fuel dispenser nozzles that are in fluid communication with the fuel storage facility can be received. The fuel transaction data can include a volume of fuel dispensed by the fuel dispenser nozzle and the one or more additional fuel nozzles during fuel transactions and a period of time during which the volume of fuel is dispensed by the fuel dispenser nozzle and/or the one or more additional fuel dispenser nozzles. In some implementations, the data that characterizes the volume of fuel dispensed by the fuel dispenser nozzle during the fuel transaction can be determined from the flow meter data generated by the flow meter, and the data that characterizes the volume of fuel dispensed by the one or more additional fuel dispenser nozzles can be determined by additional flow meter data generated and provided by one or more additional flow meters that are in fluid communication with the one or more additional fuel dispenser nozzles. In some implementations, data characterizing the period of time during which the volume of fuel is dispensed by the fuel dispenser nozzle and/or the one or more additional fuel dispenser nozzles can be determined from electrical/computing components of the one or more fuel dispensers coupled to the aforementioned fuel dispenser nozzles, which may be in operable communication with one or more of the aforementioned flow meters and that are configured to manage the operation of the fuel dispenser during a fuel transaction.

In some implementations, the fuel inventory data, the flow meter data, and the fuel transaction data can be received at a server. In some implementations, the server can include a wetstock management server communicatively coupled to the sensor, the aforementioned flow meters, and the one or more fuel dispensers that can collect the data. The server can be a remote, e.g., cloud-based, server located away from the fuel storage facility and/or the fueling station, however in some implementations the server can be located at the fuel storage facility and/or the fueling station. In some embodiments, the data received from the sensor can be collected by an intermediary data collection device (not shown), such as an interne of things (IoT) or edge device, located on-site, and the data collection device can transmit the collected data to the server for processing.

At 140, a meter drift estimate, characterizing a change in calibration of the flow meter, can be determined based on the received fuel inventory data, the received flow meter data, and the received fuel transaction data. In some implementations, determining the meter drift estimate can include determining a meter ratio that corresponds to the flow meter. The meter ratio can characterize a ratio of a volume of fuel dispensed by the fuel dispenser nozzle over a period of time to a change in the level of fuel stored at the fuel storage facility over the period of time. The period of time used to determine the meter ratio can be determined by analyzing the fuel transaction data to isolate portions of the fuel transaction data during which only the fuel dispenser nozzle of interest is dispensing fuel to a user (referred to herein as a "dispensing event"). The window of time during which the dispensing event occurs is the period of time used to determine the meter ratio. As the flow meter is configured to measure, in real-time, a flow rate of fuel through the fuel supply line between the fuel storage facility and the fuel dispenser nozzle, the volume of fuel dispensed by the fuel dispenser nozzle during the dispensing event can be derived from the measured flow rate and the period of time over which the dispensing event occurs. And, as the sensor can be configured to measure the level of the fuel stored at the fuel storage facility in real-time, a change in the level of fuel stored at the fuel storage facility during the dispensing event can be determined by subtracting the level of fuel stored at the fuel storage facility recorded at the end of the dispensing event from that recorded at the start of the dispensing event.

Once the meter ratio is determined, in some implementations, the meter ratio can be compared with historical data characterizing the meter ratio for the flow meter at previous points in time and analyzed for any changes in meter ratio over time. If the analysis indicates that the meter ratio has changed over time, meter drift has likely occurred, and an estimate of meter drift that characterizes an extent to which the meter ratio has changed over time can be determined from the analysis. In some implementations, the estimate of meter drift can be determined when the analysis indicates that the change of the meter ratio over time exceeds a predetermined threshold.

In some implementations, once the meter ratio is determined, the meter ratio can be compared to meter ratios for flow meters that are in fluid communication with other fuel dispenser nozzles that are supplied by the fuel storage facility and a determination of various calibration error sources can be made. For example, in some implementations, if the meter ratios for each of the flow meters has a similar pattern of deviation from a meter ratio value of 1, such a pattern of deviation can indicate a calibration error in the sensor used to measure the level of fuel stored in the fuel storage facility. For example, in some implementations, if the determined meter ratio for one or more of the flow meters deviates from 1, such a deviation can indicate a calibration error or flow meter leakage for the one or more of the flow meters.

In some implementations, particularly at very busy fueling stations where there it may not be possible to isolate in the fuel transaction data a dispensing event during which a single nozzle is dispensing fuel from the fuel storage facility, meter ratios can be determined for two or more fuel dispenser nozzles that are simultaneously dispensing fuel from the fuel storage facility by simultaneously solving a set of equations in which the volume of fuel dispensed from each nozzle during their respective dispensing events is known and the net change in the level of fuel stored in the fuel storage facility between the start of the first-in-time dispensing event and the end of the last-in-time dispensing event is known. In an exemplary implementation of this technique, in which the fuel transaction data can be analyzed to isolate a pair of overlapping dispensing events in which only two of the fuel dispensing nozzles in fluid communication with the fuel storage facility are dispensing fuel, the system of equations to be simultaneously solved is as follows:

$$m_a * \text{vol}_{1a} + m_b * \text{vol}_{1b} = \text{diff}_{s/1} \qquad \text{Eq. (1)}$$

$$m_a * \text{vol}_{2a} + m_b * \text{vol}_{2b} = \text{diff}_{s/2} \qquad \text{Eq. (2)}$$

wherein:

$m_a$ is the meter ratio for a first flow meter in fluid communication with a first nozzle a and configured to measure a flow rate of fuel through a first fuel supply line from the fuel storage facility to the first nozzle a;

$m_b$ is the meter ratio for a second flow meter in fluid communication with a second nozzle b and configured to measure a flow rate of fuel through a second fuel supply line from the fuel storage facility to the second nozzle b;

$vol_{1a}$ is the volume of fuel dispensed by the first nozzle a during the first of the two overlapping dispensing events as measured by the first flow meter;

$vol_{1b}$ is the volume of fuel dispensed by the second nozzle b during the first of the two overlapping dispensing events as measured by the second flow meter;

$vol_{2a}$ is the volume of fuel dispensed by the first nozzle a during the second of the two overlapping dispensing events as measured by the first flow meter;

$vol_{2b}$ is the volume of fuel dispensed by the second nozzle b during the second of the two overlapping dispensing events as measured by the second flow meter;

$diff_{sl1}$ is the level of fuel stored in the fuel storage facility prior to the start of the earlier of the two overlapping dispensing events; and $diff_{sl2}$ is the level of fuel stored in the fuel storage facility after the end of the later of the two overlapping dispensing events.

As all but $m_a$ and $m_b$ are known, Equations (1) and (2) can be simultaneously solved to derive values for these two meter ratios. The two meter ratios can be used in a manner similar to that described above with respect to the single-nozzle dispensing event implementation of the current subject matter to determine estimates of meter drift for the first and second flow meters. And, although this example illustrates an approach for use when overlapping dispensing events featuring two fuel dispenser nozzles are isolated from the fuel transaction data, this approach can be generalized for overlapping dispensing events featuring any number of fuel dispenser nozzles that simultaneously dispense fuel from the fuel storage facility. A mathematical representation of such a generalization of the approach is shown as Equation (3):

$$vol \times m = diff \quad \text{Eq. (3)}$$

wherein $$vol = \begin{bmatrix} vol_{1a} & \cdots & volna \\ \vdots & \ddots & \vdots \\ volna & \cdots & volnn \end{bmatrix}_{n \times n}, m = \begin{bmatrix} m_{aa} \\ \cdots \\ m_{nn} \end{bmatrix}_{n \times 1}, diff = \begin{bmatrix} diff_{aa} \\ \cdots \\ diff_{nn} \end{bmatrix}_{n \times 1}$$

Consistent with Equation (3) a system of linear equations with as many nozzles connected to each fuel storage facility can be constructed and solved, extending the methodology to more than just two nozzles. To obtain data, samples of simultaneous dispensing involving one or more nozzles can be taken over different time periods. The time periods may or may not be contiguous for the application.

Additionally, in some implementations, a method for determining the meter ratio (or meter ratios) can employ artificial intelligence and/or machine learning based techniques and algorithms, where the input variables are changes in stock levels and nozzle-wise dispensed amounts, and the outcomes are meter ratios. In some implementations, the method can employ classification as well as regression techniques. For classification, the outcomes could be one of "high under-dispensing", "moderate under-dispensing", "within range", "moderate over-dispensing", and "high over-dispensing," and the definitions as to what conditions would result in each of these outcomes can be predetermined. For regression, the outcomes would simply be the meter ratios as explained thus far.

Finally, in some implementations, the method for determining the meter ratio (or meter ratio) can encompass machine learning based methods like random forest, support vector machines, boosted trees etc., as well as deep learning based methods with a custom-developed or any of the modern architectures like VGG9, VGG16, LSTM etc. or variant thereof, that would suit the problem at hand.

At 150, the estimate of meter drift can be provided. In some implementations, the estimate of meter drift can be provided to a server that can generate a notification indicative of the estimate of meter drift and provide the notification to an end terminal for further processing and/or display. In some implementations, the server can be a remote server located at a location that is different from that of the fuel storage facility and/or the fuel dispenser. In some implementations, the server can be located at the same location as the fuel storage facility and/or the fuel dispenser (e.g., the fueling station). In some implementations, the end terminal can be located at a location that is different from that of the fuel storage facility and/or the fuel dispenser. In some implementations, the end terminal can be located at the same location as the fuel storage facility and/or the fuel dispenser (e.g., the fueling station). In some implementations, the notification can be a visual alert that is displayed on a display in operable communication with any of the aforementioned servers and end terminals to thereby indicate the possible existence of the meter drift. In some implementations, the estimate of meter drift can be presented in graphical form to an end user, via one or more of the aforementioned displays. Examples of these graphical presentations are described in further detail below. In some implementations, the aforementioned deviation of a meter ratio from 1 can also be provided for further notification/analysis, in a manner similar to that of the aforementioned estimate of meter drift, so that action can be taken to address fuel storage facility sensor/flow meter calibration errors and flow meter leakages.

Figure 2:
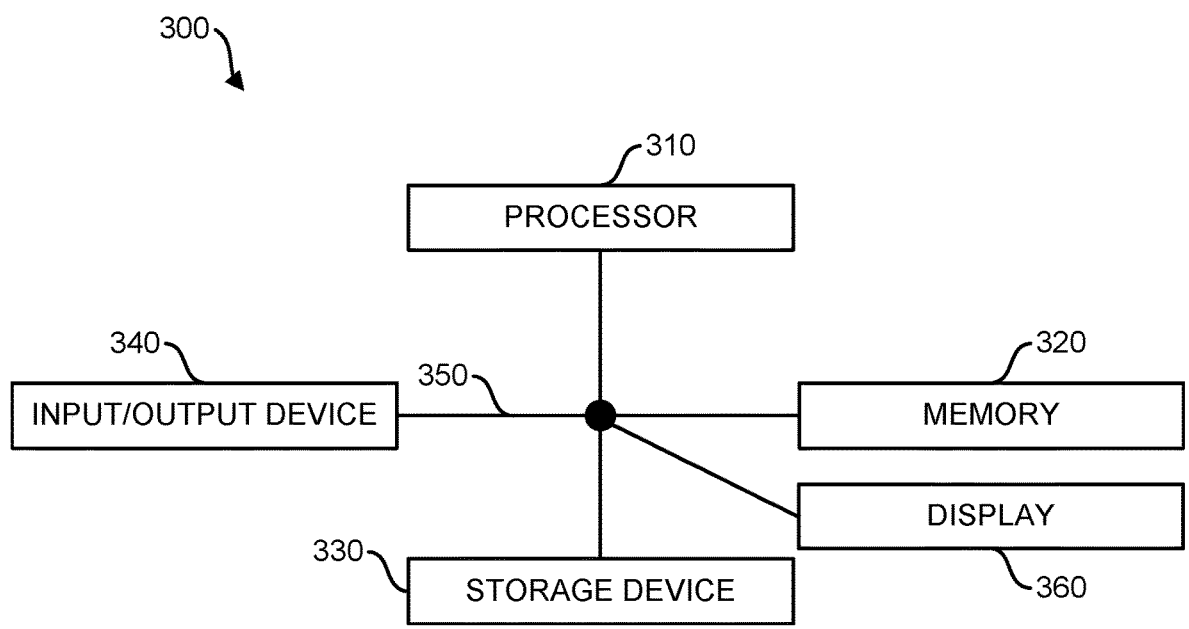
FIG. 2 is a schematic diagram of an exemplary system for implementing the current subject matter, as shown and described herein.
Figure 3:
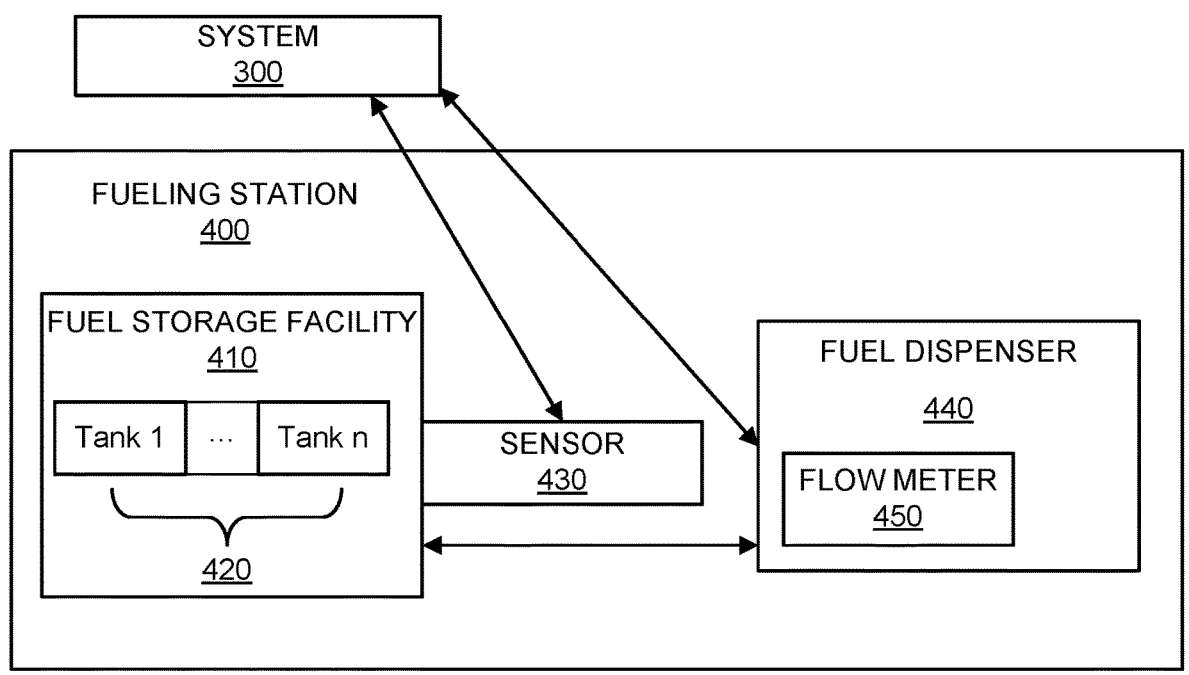
FIG. 3 is a schematic diagram of a fueling station that is in operable communication with the system of FIG. 2.

In some implementations, the current subject matter can be configured to be implemented in a system 300, as shown in FIG. 2. The system 300 can include one or more of a processor 310, a memory 320, a storage device 330, and an input/output device 340. Each of the components 310, 320, 330 and 340 can be interconnected using a system bus 350. The processor 310 can be configured to process instructions for execution within the system 100. In some implementations, the processor 310 can be a single-threaded processor. In alternate implementations, the processor 310 can be a multi-threaded processor. The processor 310 can be further configured to process instructions stored in the memory 320 or on the storage device 330, including receiving or sending information through the input/output device 340. The memory 320 can store information within the system 300. In some implementations, the memory 320 can be a computer-readable medium. In alternate implementations, the memory 320 can be a volatile memory unit. In yet some implementations, the memory 320 can be a non-volatile memory unit. The storage device 330 can be capable of providing mass storage for the system 100. In some implementations, the storage device 330 can be a computer-readable medium. In alternate implementations, the storage device 330 can be a floppy disk device, a hard disk device, an optical disk device, a tape device, non-volatile solid state memory, or any other type of storage device. The input/output device 340 can be configured to provide input/output operations for the system 300. In some implementations, the input/output device 340 can include a keyboard and/or pointing device. In alternate implementations, the input/output device 340 can include a display unit for displaying graphical user interfaces. In some implementations, the system 300 can be in operable communication with one or more components of a fueling station 400, as shown in FIG. 3. The fueling station 400 can include a fuel storage facility 410, which may include one or more fuel tanks 420 disposed in the ground at the fueling station 400 that are configured to hold fuel at the fueling station 400. The one or more fuel tanks 420 of the fuel storage facility 410 can be in operable communication with one or more sensors 430 that are located proximate the fuel storage facility 410 and configured to acquire data characterizing the fuel stored in the one or more fuel tanks 420, the one or more fuel tanks 420, and the fuel storage facility 410. The one or more sensors 430 can also be in operable communication with the system 300 such that the system 300 can receive the acquired data for use in determining the estimate of meter drift.

The one or more fuel tanks 420 of the fuel storage facility 410 can also be in fluid and operable communication with a fuel dispenser 440, which can dispense the fuel contained in the one or more fuel tanks to a customer via one or more fuel dispenser nozzles coupled to the fuel dispenser. The fuel dispenser can include a flow meter 450 that is configured to determine a volumetric rate of fuel provided by the one or more nozzles of the fuel dispenser to a customer during a fuel dispensing transaction and to provide the volumetric rate of fuel dispensed to a processor of the fuel dispenser, which can use the volumetric rate of fuel dispensed to determine an amount of fuel dispensed by the one or more nozzles of the fuel dispenser. The fuel dispenser 440 can be in operable communication with the system 300 such that the system 300 can receive data from the fuel dispenser 440 characterizing the amount of fuel provided to the customer from the one or more nozzles during the sale of fuel to the customer, which is based on the volumetric rate of fuel provided by the flow meter 450. This data can be used by the system 300 to determine the estimate of meter drift in accordance with the methods and techniques described elsewhere herein.

Figure 4A:
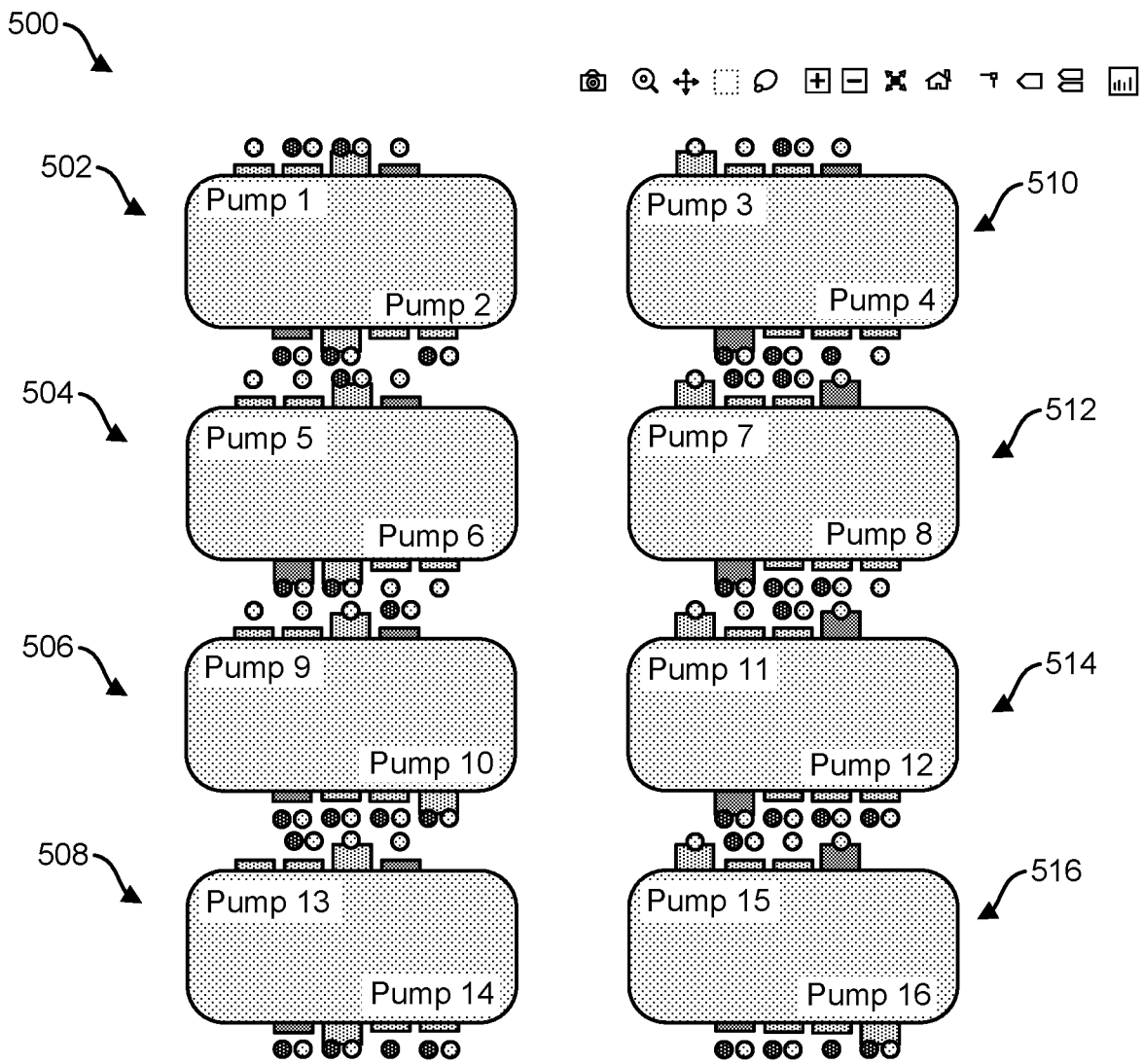
FIG. 4A is an exemplary depiction of a graphical user interface that includes a schematic diagram configured to depict meter drift estimates for a series of fuel dispensers located at the fueling station and in fluid communication with the fuel storage facility.
Figure 4B:
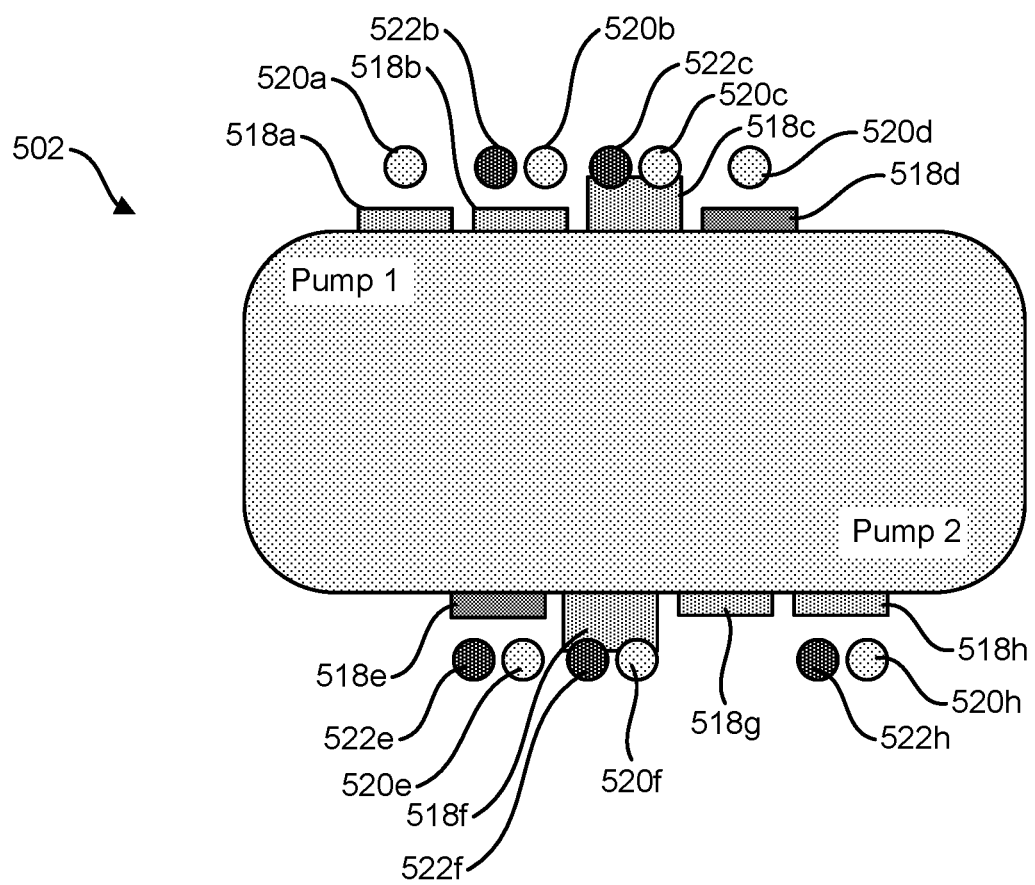
FIG. 4B is a detailed view of the first fuel dispenser of FIG. 4A.

The provided estimate of meter drift can be used to generate and provide graphical data that characterizes whether a flow meter in fluid communication with the fuel storage facility is experiencing meter drift. For example, FIGS. 4A and 4B show an exemplary depiction of a graphical user interface 500 that includes a schematic diagram configured to depict estimates of meter drift for a series of fuel dispensers located at the fueling station and in fluid communication with the fuel storage facility. As shown, the graphical user interface 500 can include schematic representations of fuel dispensers at a fueling station, such as fuel dispenser icons 502-516. The fuel dispenser icons 502-516 can be configured to indicate a status of the fuel dispensers at the fueling station to which they correspond and whether a flow meter associated with one or more of the nozzles/available grades at the fuel dispensers is likely to be experiencing meter drift. As shown in FIG. 4B, which is a detailed view of the fuel dispenser icon 502, the fuel dispenser icon 502 includes grade icons 518a-h which correspond to the various grades of fuel available at the fuel dispenser corresponding to fuel dispenser icon 502. As shown in FIG. 4B, some of the grade icons 518a-h can be presented in a raised position relative to the fuel dispenser icon 502. The raised position of the grade icons 518a-h can indicate grades of fuel that are dispensed at higher volumes than other grades available at the fuel dispenser. In some implementation, wherein each grade available at the fuel dispenser is dispensed via a separate nozzle, the raised position of the grade icons 518a-h can indicate nozzles that dispense fuel at higher volumes than other nozzles of the fuel dispensers. The grade icons 518a-h can be shown in the raised position to provide an indication of the possible severity of impact of meter drift of the flow meter associated with the corresponding fuel grade. As the severity of impact of meter drift is directly related to the dispensed volume, the presence of the raised position of one or more of the grade icons 518a-h can indicate that the occurrence of meter drift of the flow meter corresponding to the grade icon would have high loss impacts.

The fuel dispenser icon 502 can also include meter drift estimate icons 520a-h and 522a-h for each of the grade icons 518a-h that are selectively presented in the graphical user interface 500 based on the whether an estimate of meter drift has been determined (not all of 520a-h and 522a-h are shown in FIG. 4B). If the meter drift estimate icons 520a-h are depicted next to their corresponding grade icons, this can indicate that the flow meter associated with that fuel grade and/or fuel dispenser nozzle is possibly experiencing meter drift. If the meter drift estimate icons 522a-h are depicted next to their corresponding grade icons, this can indicate that the flow meter associated with that fuel grade and/or fuel dispenser nozzle is likely experiencing meter drift. In some implementations, each of fuel dispenser icons 502-516 can include a pop-up window (not shown) is configured to permit a viewer of the graphical user interface 500 to take further action based on the indicated presence of meter drift. For example, the pop-up window can include functionality that permits the viewer to transmit an alarm or notification to a fueling station attendant to thereby notify the fueling station attendant to take corrective action to address the possible meter drift. In some implementations, the alarm or notification can be raised to a service technician or to a dealer to thereby notify the service technician/dealer to take the corrective action. Although the functionality described herein is described with respect to fuel dispenser icon 502, this functionality is also included for fuel dispenser icons 504-516.

Figure 5:
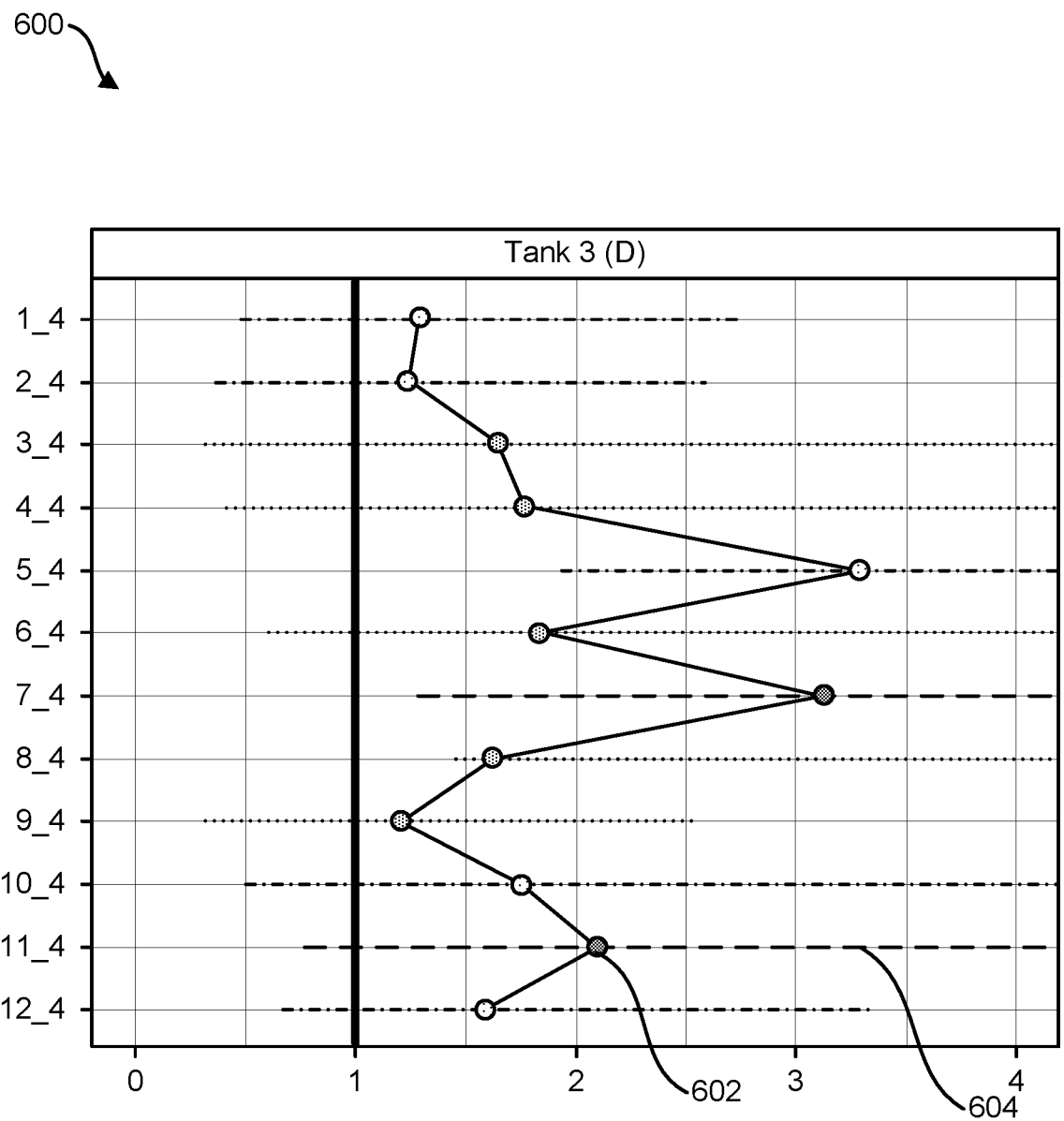
FIG. 5 is an exemplary depiction of a graphical display that shows an average meter ratios for each flow meter in fluid communication with the fuel dispenser, a historical range of meter ratios for each flow meter, and a degree of confidence in the data characterizing the meter ratios.

The determined meter ratios can also be used to generate and provide graphical data that indicates whether a flow meter is experiencing a calibration error relative to other flow meters in fluid communication with the fuel storage facility. For example, FIG. 5 is an exemplary depiction of a graphical display 600 that shows an average meter ratio for each of flow meters 1_4 through 12_4 that are in fluid communication with the fuel storage facility and a fuel dispenser nozzle, a historical range of meter ratios for each of flow meters 1_4 through 12_4, and a degree of confidence in each flow meter. The value of the determined meter ratio is provided on the x-axis of the graphical display 600. As shown, for each of flow meters 1_4 through 12_4, the graphical display can provide an average meter ratio, which is derived from currently-determined meter ratios and historically-determined meter ratios, and is graphically depicted by a dot that corresponds to the flow meters 1_4 through 12_4. An example dot that indicates an average meter ratio is shown for flow meter 11_4 as dot 602. In some implementations, the graphical display 600 can also provide a range of meter ratios, for each of flow meters 1_4 through 12_4 and which is derived from the currently-determined meter ratios and the historically-determined meter ratios. The range of meter ratios can be graphically depicted in graphical display 600 as a line, and an example line for flow meter 11_4 is shown in graphical display 600 as line 604. In addition, in some implementations, as shown in FIG. 5, the graphical display 600 can indicate a degree of confidence in the provided average meter ratio for a flow meter by darkening the shading of the presented dot and line corresponding to that flow meter.

Figure 6A:
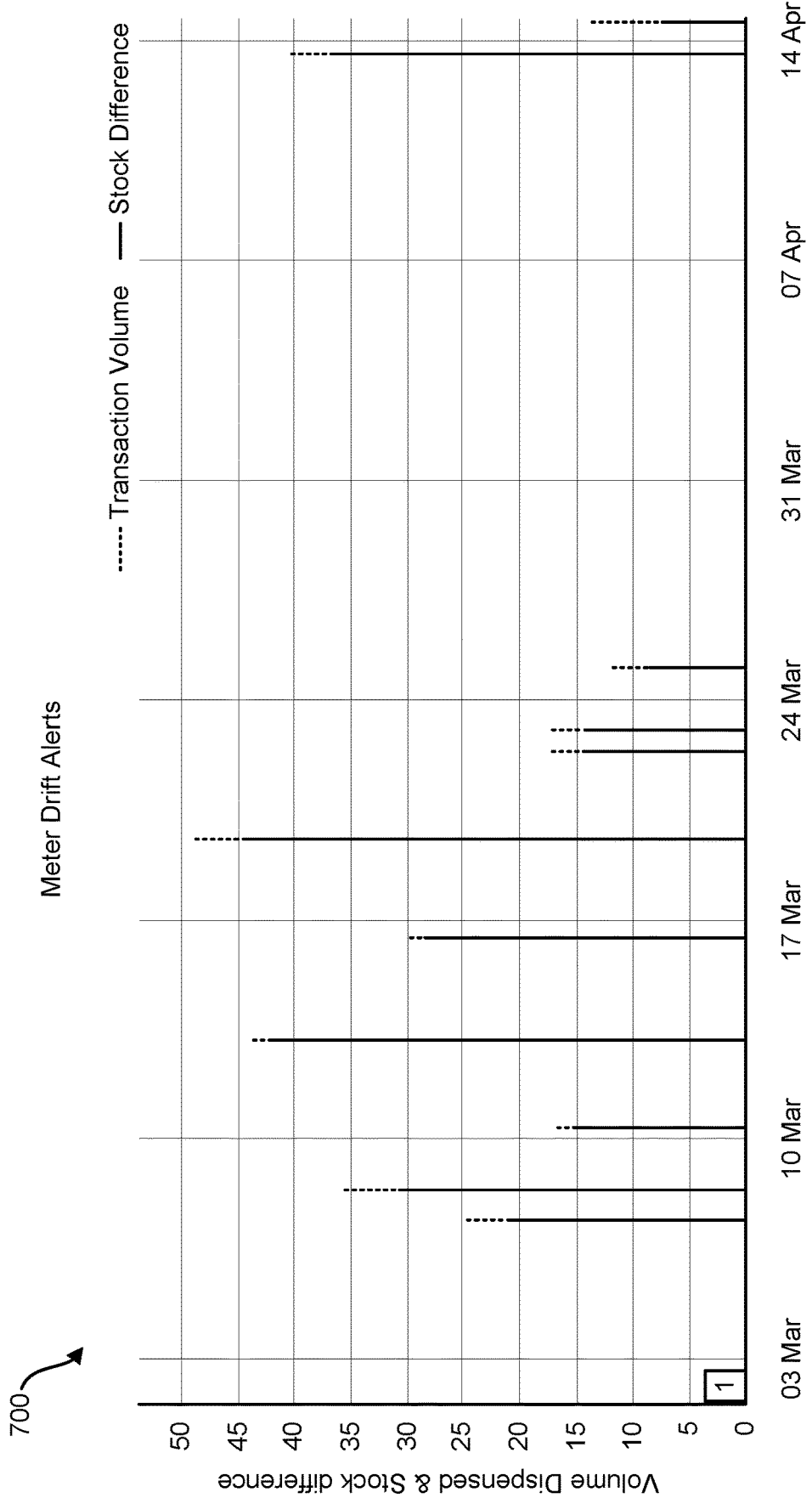
FIG. 6A is an exemplary depiction of a graphical display that shows a bar chart overlay characterizing an amount of fuel dispensed from a fuel dispenser nozzle and an amount of fuel removed from a fuel storage facility on a daily basis.
Figure 6B:
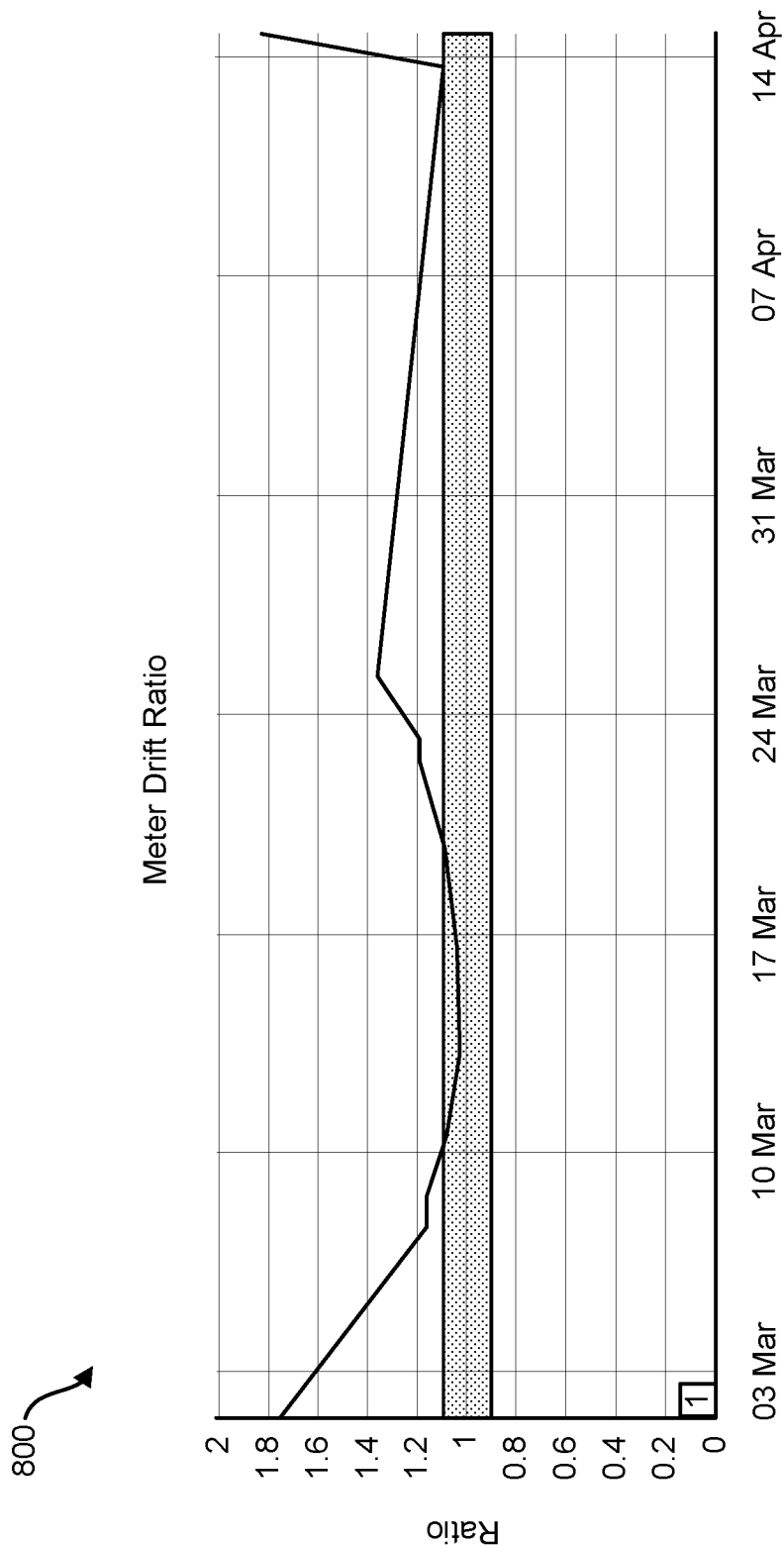
FIG. 6B is an exemplary depiction of a graphical display that depicts changes in the meter ratio on a daily basis.

The determined meter ratios can also be used to generate and provide graphical data that indicates the presence of meter drift on a daily basis over a given time period of interest, which can be used to further analyze the extent of the meter drift. For example, FIG. 6A is an exemplary depiction of a graphical display 700 that shows a first bar chart characterizing an amount of fuel dispensed from a fuel dispenser nozzle and a second bar chart, overlaid on top of the bar chart characterizing an amount of fuel dispensed from a fuel dispenser nozzle, that characterizes an amount of fuel removed from a fuel storage facility on a daily basis, and FIG. 6B is an exemplary depiction of a graphical display 800 that depicts changes in the meter ratio on a daily basis. As shown in FIG. 6A, for at least some of the days of data provided, the lengths of the bars of the first bar chart and the second bar chart are not equal, thereby indicating that a discrepancy exists between the displayed amount of fuel dispensed from the fuel dispenser nozzle of the first bar chart and the displayed amount of fuel removed from the fuel storage facility of the second bar chart, for one or more of the days for which data has been obtained (listed on the x-axis), which may be indicative of a calibration issue with the flow meter in fluid communication with the fuel dispenser nozzle. This discrepancy can be used to determine a meter ratio using the techniques described herein on a daily basis, and the determined meter ratio can be graphically depicted as shown the graphical display 800 of FIG. 6B. Given that the meter ratio as shown in the graphical display 800 varies over time, the graphical display 800 can visually indicate the existence of meter drift.

Accordingly, the system as discussed herein can combine all known alerts and data points, site equipment, and infrastructure details into a model to provide a user with an estimate of meter drift and of fuel storage facility/flow meter calibration errors and malfunctions. By applying artificial intelligence and machine learning techniques to provide model and parameter recommendations, wetstock management can be performed more efficiently, thereby saving costs and improving safety.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method comprising:
   receiving, from a sensor in operable communication with a fuel storage facility, fuel inventory data characterizing a level of fuel stored at the fuel storage facility;
   receiving, from a flow meter in fluid communication with a fuel dispenser nozzle and the fuel storage facility, flow meter data characterizing an amount of fuel dispensed from the fuel storage facility by the fuel dispenser nozzle and measured by the flow meter;
   receiving fuel transaction data characterizing the dispensing of fuel by the fuel dispenser nozzle and the dispensing of the fuel by one or more additional fuel dispenser nozzles, the one or more additional fuel dispenser nozzles in fluid communication with the fuel storage facility;
   determining an estimate of meter drift characterizing a change in calibration of the flow meter based on the received fuel inventory data, the received flow meter data, and the received fuel transaction data, the determining including:

determining a meter ratio corresponding to the flow meter, the meter ratio characterizing a ratio of a determined volume of fuel dispensed by the fuel dispenser nozzle over a period of time to a determined change in the level of fuel stored at the fuel storage facility over the period of time, and determining an amount of deviation of the determined meter ratio from previously-determined meter ratios corresponding to the flow meter, wherein the determined amount of deviation characterizes the estimate of meter drift; and providing the estimate of meter drift.

2. The method of claim 1, wherein the period of time is defined by a dispensing event in which fuel is dispensed only by the fuel dispenser nozzle, and wherein the dispensing event is determined based on the received fuel inventory data, the received flow meter data, and the received fuel transaction data.

3. The method of claim 2, wherein the volume of fuel dispensed by the fuel dispenser nozzle over the period of time is determined based on the flow meter data and the determined dispensing event.

4. The method of claim 3, wherein the change of the level of fuel stored at the fuel storage facility is determined based on the received fuel inventory data and the determined dispensing event.

5. The method of claim 1, further comprising:
comparing the determined meter ratio to one or more additional meter ratios, the one or more meter ratios each corresponding to one or more additional flow meters, each of the one or more additional flow meters in fluid communication with one of the one or more additional fuel dispenser nozzles and the fuel storage facility; and determining a discrepancy factor for the flow meter based on the comparison, the discrepancy factor characterizing a deviation of the determined meter ratio from the one or more additional meter ratios.

6. The method of claim 1, further comprising:
receiving second flow meter data from a second flow meter in fluid communication with a second fuel dispenser nozzle and the fuel storage facility, the second flow meter data characterizing an amount of fuel dispensed from the fuel storage facility by the second fuel dispenser nozzle and measured by the second flow meter;

determining, based on the received fuel inventory data, the flow meter data, the second flow meter data, and the fuel transaction data, an overlapping dispensing event, the overlapping dispensing event characterizing a first period of time in which fuel is dispensed by the fuel dispenser nozzle and a second period of time in which fuel is dispensed by the second fuel dispenser nozzle, such that at least a portion of the first and second periods of time overlap during a period of overlap, and that fuel is only dispensed from the fuel dispenser nozzle and the second fuel dispenser nozzle during the period of overlap.

7. The method of claim 6, further comprising:
determining a change of the level of fuel stored at the fuel storage facility during a window of time which begins with the earlier of the start of the first period of time and the second period of time and ends with the later of the end of the first period of time and the second period of time;

determining a first meter ratio corresponding to the flow meter and based on the determined change of the level of fuel, the flow meter data, the fuel transaction data, and the second flow meter data; and determining a second meter ratio corresponding to the second flow meter and based on the determined change of the level of fuel, the flow meter data, the fuel transaction data, and the second flow meter data.

8. The method of claim 7, further comprising:
determining an amount of deviation of the determined first meter ratio from previously-determined meter ratios corresponding to the flow meter, wherein the determined amount of deviation characterizes the meter drift estimate corresponding to the flow meter.

9. The method of claim 1, wherein providing the estimate of meter drift includes:
determining a graphical depiction characterizing the estimate of meter drift; and
providing the graphical depiction to a graphical user interface for depiction on a display.

10. The method of claim 9, wherein the graphical user interface is configured to indicate that the estimate of meter drift exceeds a predetermined meter drift threshold.

11. A system comprising:
at least one data processor; and
memory storing instructions configured to cause the at least one data processor to perform operations comprising:
receiving, from a sensor in operable communication with a fuel storage facility, fuel inventory data characterizing a level of fuel stored at the fuel storage facility;

receiving, from a flow meter in fluid communication with a fuel dispenser nozzle and the fuel storage facility, flow meter data characterizing an amount of fuel dispensed from the fuel storage facility by the fuel dispenser nozzle and measured by the flow meter;

receiving fuel transaction data characterizing the dispensing of fuel by the fuel dispenser nozzle and the dispensing of the fuel by one or more additional fuel dispenser nozzles, the one or more additional fuel dispenser nozzles in fluid communication with the fuel storage facility;

determining an estimate of meter drift characterizing a change in calibration of the flow meter based on the received fuel inventory data, the received flow meter data, and the received fuel transaction data, the determining including,
determining a meter ratio corresponding to the flow meter, the meter ratio characterizing a ratio between a determined volume of fuel dispensed by the fuel dispenser nozzle over a period of time and a determined change in the level of fuel stored at the fuel storage facility over the period of time, and determining an amount of deviation of the determined meter ratio from previously-determined meter ratios corresponding to the flow meter, wherein the determined amount of deviation characterizes the estimate of meter drift; and providing the estimate of meter drift.

12. The system of claim 11, wherein the period of time is defined by a dispensing event in which fuel is dispensed only by the fuel dispenser nozzle, and wherein the dispensing event is determined based on the received fuel inventory data, the received flow meter data, and the received fuel transaction data.

13. The system of claim 12, wherein the volume of fuel dispensed by the fuel dispenser nozzle over the period of time is determined based on the flow meter data and the determined dispensing event.

14. The system of claim 13, wherein the change of the level of fuel stored at the fuel storage facility is determined based on the received fuel inventory data and the determined dispensing event.

15. The system of claim 11, wherein the operations further comprise:
   comparing the determined meter ratio to one or more additional meter ratios, the one or more meter ratios each corresponding to one or more additional flow meters, each of the one or more additional flow meters in fluid communication with one of the one or more additional fuel dispenser nozzles and the fuel storage facility; and
   determining a discrepancy factor for the flow meter based on the comparison, the discrepancy factor characterizing a deviation of the determined meter ratio from the one or more additional meter ratios.

16. The system of claim 11, wherein the operations further comprise:
   receiving second flow meter data from a second flow meter in fluid communication with a second fuel dispenser nozzle and the fuel storage facility, the second flow meter data characterizing an amount of fuel dispensed from the fuel storage facility by the second fuel dispenser nozzle and measured by the flow meter; and
   determining, based on the received fuel inventory data, the flow meter data, the second flow meter data, and the fuel transaction data, an overlapping dispensing event, the overlapping dispensing event characterizing a first period of time in which fuel is dispensed by the fuel dispenser nozzle and a second period of time in which fuel is dispensed by the second fuel dispenser nozzle, such that at least a portion of the first and second periods of time overlap during a period of overlap, and that fuel is only dispensed from the fuel dispenser nozzle and the second fuel dispenser nozzle during the period of overlap.

17. The system of claim 16, wherein the operations further comprise:
   determining a change of the level of fuel stored at the fuel storage facility during a window of time which begins with the earlier of the start of the first period of time and the second period of time and ends with the later of the end of the first period of time and the second period of time;
   determining a first meter ratio corresponding to the flow meter and based on the determined change of the level of fuel, the flow meter data, and the second flow meter data; and
   determining a second meter ratio corresponding to the second flow meter and based on the determined change of the level of fuel, the flow meter data, and the second flow meter data.

18. The system of claim 17, wherein the operations further comprise:
   determining an amount of deviation of the determined first meter ratio from previously-determined meter ratios corresponding to the flow meter, wherein the determined amount of deviation characterizes the estimate of meter drift corresponding to the flow meter.

19. A non-transitory computer program product storing instructions which, when executed by at least one data processor forming part of at least one computing system, cause the at least one data processor to implement operations comprising:
   receiving, from a sensor in operable communication with a fuel storage facility, fuel inventory data characterizing a level of fuel stored at the fuel storage facility;
   receiving, from a flow meter in fluid communication with a fuel dispenser nozzle and the fuel storage facility, flow meter data characterizing an amount of fuel dispensed from the fuel storage facility by the fuel dispenser nozzle and measured by the flow meter;
   receiving fuel transaction data characterizing the dispensing of fuel by the fuel dispenser nozzle and the dispensing of the fuel by one or more additional fuel dispenser nozzles, the one or more additional fuel dispenser nozzles in fluid communication with the fuel storage facility;
   determining an estimate of meter drift characterizing a change in calibration of the flow meter based on the received fuel inventory data, the received flow meter data, and the received fuel transaction data, the determining including,
      determining a meter ratio corresponding to the flow meter, the meter ratio characterizing a ratio between a determined volume of fuel dispensed by the fuel dispenser nozzle over a period of time and a determined change in the level of fuel stored at the fuel storage facility over the period of time, and
      determining an amount of deviation of the determined meter ratio from previously-determined meter ratios corresponding to the flow meter, wherein the determined amount of deviation characterizes the estimate of meter drift; and
   providing the estimate of meter drift.

* * * * *